No. 665,513. Patented Jan. 8, 1901.
C. B. DUDLEY & A. S. VOGT.
VENTILATING DEVICE FOR LAMPS.
(Application filed July 10, 1900.)
(No Model.)
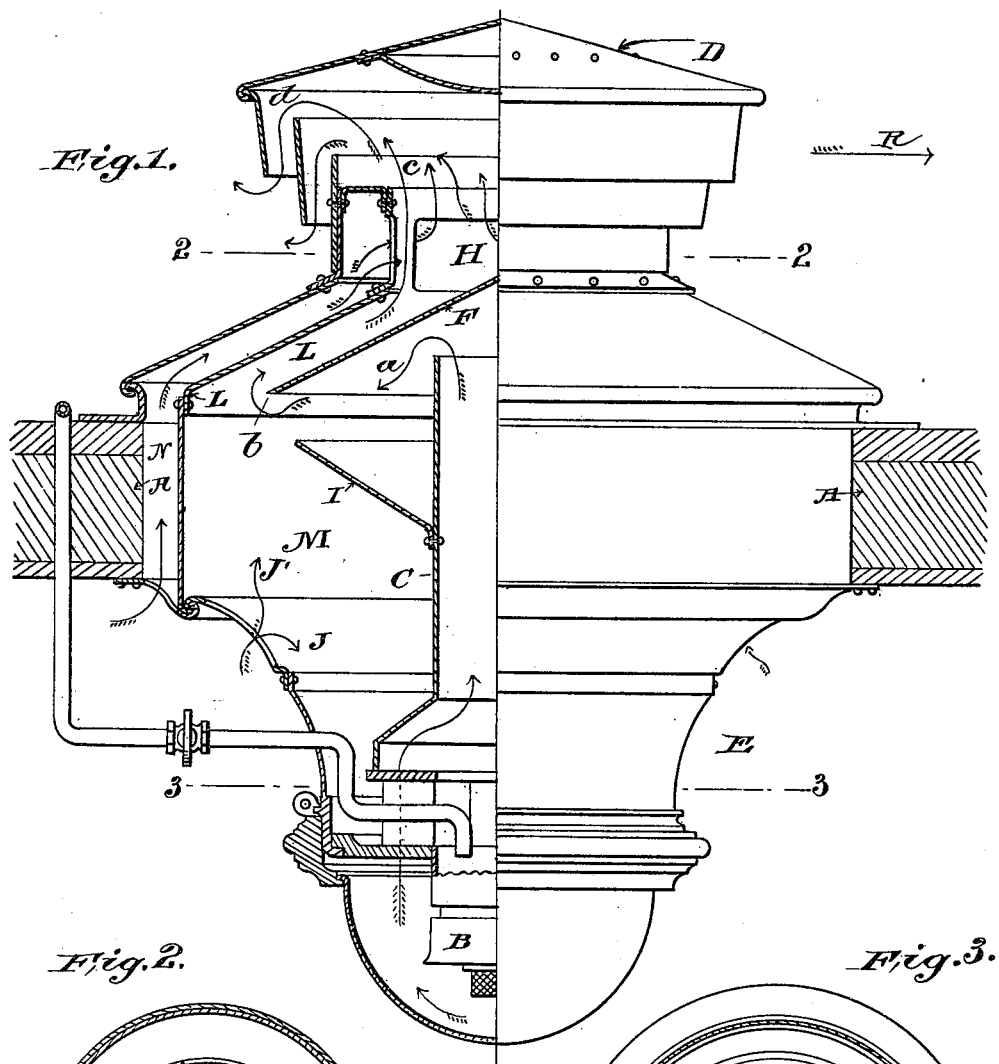
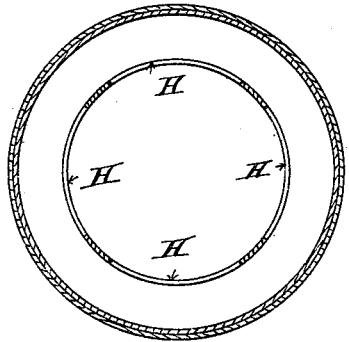
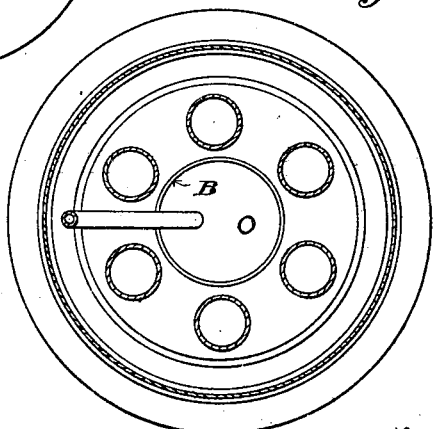

UNITED STATES PATENT OFFICE.

CHARLES B. DUDLEY AND AXEL S. VOGT, OF ALTOONA, PENNSYLVANIA.

VENTILATING DEVICE FOR LAMPS.

SPECIFICATION forming part of Letters Patent No. 665,513, dated January 8, 1901.

Application filed July 10, 1900. Serial No. 23,083. (No model.)

*To all whom it may concern:*

Be it known that we, CHARLES B. DUDLEY, a citizen of the United States, and AXEL S. VOGT, a subject of the King of Sweden and Norway, both residing at Altoona, in the State of Pennsylvania, have invented certain new and useful Improvements in Ventilating Devices for Lamps, of which the following is a description, referring to the accompanying drawings, which form a part of this specification.

This device is especially intended for use in railway-cars which are illuminated by means of gas, oil, or other combustion lamps. It is well known that when a car or other nearly-closed chamber is moved rapidly through the air or subjected to a strong wind a difference in air-pressure, more usually a slight vacuum, is produced in such chamber. As the speed or other conditions vary air-currents momentarily pass in or out of the ventilators to compensate for the difference.

If the lamps of a car are situated at considerable distance from the ventilators in the car-roof, the moving currents passing in or out through the ventilators do not produce suction on the chimney of the lamp, and the motion of the car or the wind causes little or no trouble. If, on the other hand, an attempt is made for esthetic or other reasons to place the lamp nearer the roof of the car, the moving currents passing through the ventilator disturb the action of the lamp. The object of our invention is to overcome these difficulties and enable the lamp to burn as steadily when the car is in motion or when the wind is blowing as when the car is standing still and the air is quiet and also to keep the products of combustion entirely separate from the air which feeds the flame. We obtain these results by making the ventilators of such shape and construction that the currents of air passing from the car into the outside air, or vice versa, do not produce either undue suction or pressure on the chimney of the lamp or undue suction or pressure in the air-passages which feed the flame. Also by means of a shield we are enabled to prevent the products of combustion from becoming mixed with the fresh air which supplies the lamp.

Figure 1 is a half-vertical cross-section through the center of the lamp. Fig. 2 is a cross-section on the plane 2 2, Fig. 1. Fig. 3 is a cross-section on the plane 3 3, Fig. 1.

Referring to the drawings, A represents the roof of the car in section; B, the burner; C, the chimney; D, the ventilator; E, that part of the mounting of the lamp visible from the inside of the car; F, the hood over the lamp-chimney; I, the shield to prevent the products of combustion from mixing with the fresh air supplied to the burner.

In Fig. 1, R indicates the direction of the car.

The action of the device is as follows: The air passes from the body of the car through apertures in the mounting of the lamp into the space M, as shown by the arrows J. Here part of the air passes to the burner through proper apertures in the lamp. The remainder of the air entering the space M takes the direction shown by the arrow J'. The products of combustion from the burner pass out of the chimney C, taking the direction indicated by the arrows and being prevented by the shield I from becoming mingled with the air which goes to the burner. This is the normal action of the lamp and arrangements when the car is standing still and there is no wind. When, however, the car is moving, or if there is wind and the car is standing still, the action of the ventilator D produces a suction on the space M, surrounding the lamp, which suction, acting likewise at the top of the chimney, produces such a shortening of the flame as to make the light unserviceable. Again, when the car is making a stop or the wind is diminishing in force the currents of air rushing in to supply the slight vacuum in the car, as before described, produce a slight pressure in the space M, which, extending to the top of the chimney, causes such a lowering of the flame as renders the light unserviceable. To overcome these difficulties, the additional air passage-way N and the apertures H are provided. It is obvious that the suction produced by the ventilator D can be satisfied through the passage-way N and the apertures H, as shown by the arrows, and also if the areas of the passage-way N and apertures H are properly proportioned to the passage-way L almost the whole of the suction produced by the ventilator D, whatever the speed of the car, will be supplied through the passage-way N and apertures H, thus leaving the lamp free to perform its normal functions undisturbed by whatever takes place outside the car. In practice it is found that the passage-way L should be large enough to permit the lamp to burn satisfactorily when the car is still and there is no wind, and the area of the passage-way N and the apertures H must be equal to the area of the throat of the ventilator. It is obvious that when a reverse current of air passes through the ventilator, owing to stopping the car or dropping of the wind, the top of the chimney C will be shielded from undue pressure by the apertures H and the passage-way N in the same manner that it is protected from undue suction when the air-currents are passing from the car into the outside air.

Having now specified the nature of our invention as embodied in the best form of construction known to us, we will, without attempting to enumerate the variations and changes of form of which our invention is capable, point out in the following claims the essential and distinguishing novel features of our invention.

We claim—

1. In a combined lamp and ventilator, the combination of the burner and chimney, of an annular chamber surrounding the chimney and having communication with the car beneath, with the outside air above, and with the burner and the upper end of the chimney, and an outer annular chamber in free communication with the car beneath and delivering to the outer air above in common with the first said annular chamber and a deflecting-canopy along said chimney, the base of which is situated below the opening from the inner annular chamber to the outer annular chamber, substantially as set forth.

2. In a combined lamp and ventilator, the combination of the burner and chimney, of an annular chamber surrounding the chimney and having communication with the car beneath, with the outside air above, and with the burner and the upper end of the chimney, and an outer annular chamber in free communication with the car beneath and delivering to the outer air above in common with the first said annular chamber, and a deflecting-canopy above the said chimney terminating downward near the periphery of the first said chamber, and a circular shield I beneath said canopy, substantially as set forth.

Signed this 27th day of June at Altoona, Pennsylvania.

CHAS. B. DUDLEY.
A. S. VOGT.

Witnesses:
E. M. JONES,
C. W. KEPHART.